May 31, 1927.
H. W. HITZEMANN
VALVE FOR OIL BURNERS
Filed Feb. 4, 1926
1,631,109
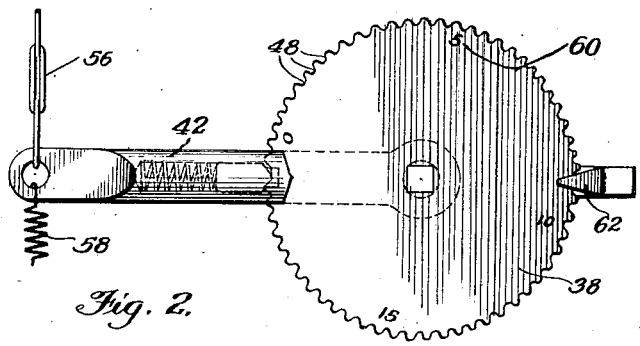
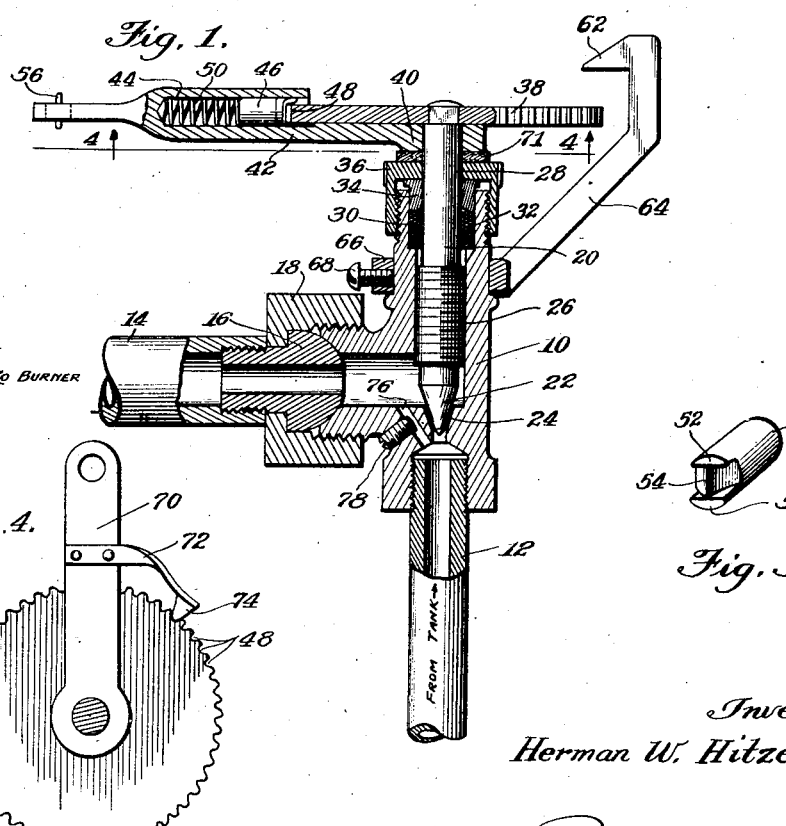
Inventor
Herman W. Hitzemann.
By Pierce and Sweet
Attys.

Patented May 31, 1927.

1,631,109

UNITED STATES PATENT OFFICE.

HERMAN W. HITZEMANN, OF ROSELLE, ILLINOIS.

VALVE FOR OIL BURNERS.

Application filed February 4, 1926. Serial No. 85,969.

My present invention relates to oil burners, and more specifically to an improved control valve for such burner. Among the objects and advantages of the invention may be enumerated:

First, to increase the convenience with which the house-holder can change the adjustment of the oil burner;

Second, to eliminate the use of two valve casings;

Third, to eliminate the necessity for the use of two valves; and

Fourth, to incorporate the improvement as an attachment on valves already in service at a minimum of expense in making the change.

Further objects and advantages of the invention will become apparent as the description proceeds.

In the accompanying drawings:

Figure 1 is a view, chiefly in central axial section, of a valve, indicating the application of principles of the invention thereto;

Figure 2 is a plan view of the valve shown in Figure 1;

Figure 3 is an enlarged detail perspective of the pawl; and

Figure 4 is a partial section on a line corresponding to line 4—4 of Figure 1, indicating a modified construction.

In the embodiment of the invention selected for illustration in Figures 1, 2 and 3, the valve comprises a casing 10 threaded to an inlet pipe 12 leading from the tank or other supply of liquid fuel, and connected to the discharge pipe 14 leading to the burner by means of a union 16 and clamping nut 18. A valve member 20 is housed in a bore opposite the inlet pipe 12, and comprises a valve portion proper 22 adapted to seat on a seat 24 formed in the body, a thread portion 26 engaging cooperating threads on the corresponding portion of the bore, and a cylindrical portion or shank, 28 extending through and beyond a cylindrical portion 30 of the body. The cylindrical portions 28 and 30 are of different diameters to define an annular clearance receiving the packing 32 compressed by the follower 34 forced down by the cap nut 36.

The structure above described is old and well known in the art and per se forms no part of my present invention.

The shank 28 extends beyond the cap nut 36 and carries a control disc 38 riveted, or otherwise suitably attached, to the end of the shank. Between the disc 38 and the cap nut 36 lies the eye 40 of the control arm 42. This arm is provided with a socket 44 housing a pawl 46 pressed against serrations 48 on the edge of the disc 38 by a suitable spring 50. To keep the pawl properly aligned with the serrations or ratchet, it is provided with top and bottom toes 52 riding on the upper and lower surfaces of the disc, and a vertical toe 54 lying between the toes 52 and entering the serrations. The outer end of the arm 42 may be connected by a chain 56 to the usual control thermostat operating to raise the arm against the action of suitable return means such as a weight, or the spring 58.

I prefer to position indicia 60 around the periphery of the disc 38 and to provide an indicating pointer 62 at the end of an arm 64 supported by a ring 66 clamped on the body 10 by a set screw 68. This is a convenience to the operator in adjusting and calibrating the device in service.

It will be apparent that the thermostat, if properly designed, can move the control arm 42 approximately sixty degrees in either direction from the position of Figure 2. This provides a range of adjustment of the needle valve amounting to substantially one-third of the pitch of the threads at 26. In most installations, this range is not quite sufficient to take care of the variation in the load on the heating plant between mild fall weather when a little heat is desired and zero weather when the load is heaviest. Thus, if the system as a whole operated nicely during fall weather at or near the position of Figure 2, the coming of zero weather would force the thermostat to operate nearly all the time with the arm 42 down about sixty degrees. Any fluctuation in the demand would carry the device beyond its operating range. However, a rotation of the disc 38 about sixty degrees in a counter-clockwise direction with respect to the arm, would readjust the entire system so that normal operation would again take place with a much larger fire, but with the arm 42 at or near the position of Figure 2 and plenty of reserve power obtainable when the thermostat lets the arm move down.

I prefer to provide a resilient washer 71 between the eye 40 and the cap nut to eliminate looseness and rattling.

In Figure 4, I have illustrated a plain arm 70 to which is attached a strip of spring metal 72 terminating in a tooth 74 engaging the serrations 48. This construction is materially simpler but not as well protected against accidental injury.

Because most oil burners require a certain minimum flow of fuel to keep them from going out, it has been customary in the past to install them with two different and independent valves, one set to provide the constant minimum flow necessary to keep the burner in operation, and the other operated by a thermostat from a completely closed position to an open position in which it increases the delivery of fuel. To secure a similar operating characteristic for the valve shown in Figure 1, I prefer to drill a small by-pass 76 around the valve controlled by a set screw 78. It will be noted that the nut 18 overlies the set screw 78, and the screw is hidden under the edge of the nut, where it is inaccessible unless the union is taken apart. This prevents anyone who does not assume to be competent to disassemble and adjust the outfit, from tampering with the setting of the by-pass.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. An oil burner valve comprising a casing having an inlet passage, an outlet passage and a bore axially aligned with one of said passages, a needle valve member in said bore, the passage opposite said bore having a seat for said valve member, said valve member and bore having threaded inter-engaging portions, and cylindrical portions defining an annular clearance space, a packing in said clearance space, a cap nut threaded on said body for compressing said packing, said valve member projecting through said packing and nut, a regulating disc fastened to the end of said valve member and having a serrated edge, a regulating arm having an eye at one end pivotally supported by said valve member, said arm having a socket in axial alignment with the edge of said disc, a spring pressed pawl in said socket engaging the serrated edge of said disc, and control means acting on the outer end of said arm.

2. An oil burner valve comprising a casing, having an inlet passage, an outlet passage and a bore axially aligned with one of said passages, a valve member in said bore, the passage opposite said bore having a seat for said valve member, said valve member and bore having threaded inter-engaging portions, and cylindrical portions defining an annular clearance space, a packing in said clearance space, a cap nut threaded on said body for compressing said packing, said valve member projecting through said packing and nut, a regulating disc fastened to the end of said valve member and having a serrated edge, a regulating arm having an eye at one end pivotally supported by said valve member between said disc and said cap nut, said arm having a socket in axial alignment with the edge of said disc, a spring pressed pawl in said socket engaging the serrated edge of said disc, and control means acting on the outer end of said arm.

3. An oil burner valve comprising a casing having an inlet passage, an outlet passage and a bore opposite one of said passages, a valve member in said bore, the passage opposite said bore having a seat for said valve member, said valve member projecting beyond said bore, a regulating disc fastened to the end of said valve member and having a serrated edge, a regulating arm having an eye at one end pivotally supported by said valve member, a spring pressed pawl on said arm engaging the serrated edge of said disc, and control means acting on the outer end of said arm.

4. An oil burner valve comprising a casing, a valve member threaded in said casing and having a shank projecting rearwardly therefrom, a disc fixed on the end of said shank for rotating said valve member to open and close said valve, a control arm pivoted on said shank between said disc and said casing, automatic regulating means acting on the end of said arm, and a resilient pawl and ratchet connection between said arm and the edge of said disc, whereby the range of action of said automatic regulating means may be manually adjusted.

5. An oil burner valve comprising a casing, a valve member threaded in said casing and having a shank projecting rearwardly therefrom, a disc fixed on the end of said shank for rotating said valve member to open and close said valve, a control arm pivoted on said shank, automatic regulating means acting on the end of said arm, and a resilient pawl and ratchet connection between said arm and said disc, whereby the range of action of said automatic regulating means may be manually adjusted.

6. An oil burner valve comprising a casing, a valve member threaded in said casing and having a shank projecting rearwardly therefrom, a disc fixed on the end of said shank for rotating said valve member to open and close said valve, a by-pass around said valve, a set screw for restricting or closing said by-pass, an oil delivery tube, and a coupling between said tube and said casing, said coupling overlying said set screw to prevent access thereto.

7. An oil burner valve comprising a casing; a valve member in said casing having a projection extending outside said casing; control means acting on said projection for opening and closing said valve; a by-pass around said valve member; means independent of and relatively inaccessible compared with said control means, for adjusting the area of said by-pass; inlet means for conveying oil to both said valve and said by-pass, and a common discharge means for delivering oil passing through said by-pass or said valve or both.

In witness whereof, I hereunto subscribe my name this 2nd day of February, 1926.

HERMAN W. HITZEMANN.